United States Patent [19]

Bath

[11] Patent Number: 4,699,524

[45] Date of Patent: Oct. 13, 1987

[54] SUPPLEMENTARY COOLING SYSTEM FOR THRUST BEARING

[75] Inventor: Duncan T. Bath, Peterborough, Canada

[73] Assignee: Canadian General Electric Company Limited, Toronto, Canada

[21] Appl. No.: 13,073

[22] Filed: Feb. 9, 1987

[30] Foreign Application Priority Data

May 9, 1986 [CA] Canada .................................. 508815

[51] Int. Cl.⁴ ............................................. F16C 17/06
[52] U.S. Cl. .................................... 384/306; 384/122; 384/316
[58] Field of Search ............... 384/306, 316, 122, 307, 384/308, 313

[56] References Cited

U.S. PATENT DOCUMENTS

| | | | |
|---|---|---|---|
| 3,131,005 | 4/1964 | Wagley | 384/306 |
| 3,891,281 | 6/1975 | Jenness | 384/306 |
| 4,322,116 | 3/1982 | Heinemann et al. | 384/306 |
| 4,474,483 | 10/1984 | Suzuki et al. | 384/316 |

FOREIGN PATENT DOCUMENTS 889218 12/1971 Canada .

Primary Examiner—Lenard A. Footland
Attorney, Agent, or Firm—Raymond A. Eckersley

[57] ABSTRACT

Apparatus for providing supplementary cooling to the thrust bearing of a vertical shaft machine, without requiring an additional exterior pump and motor, has an oil conducting path formed by grooves in the engaging surfaces of an upper and a lower portion of each bearing shoe. The oil conducting path terminates at an opening on either side of the outer periphery of the shoe. A nozzle is mounted in each opening. The nozzle extends upwardly with a horizontally extending nose portion with the nozzle opening in the end. The nose portion is adjacent the outer periphery of the rotating bearing ring which the shoes support. The ring is mounted to the vertical shaft. The shoes and the ring are immersed in an oil bath. Rotation of the shaft and the ring moves the oil adjacent the periphery of the ring. The nozzles are oriented in opposite directions, preferably facing one another. The oil caused to move by the rotating ring enters the opening in the end of one nozzle, moves through the oil conducting path, and exits from the other nozzle in the direction of oil movement. The apparatus provides supplementary cooling by oil circulation regardless of the direction of rotation.

10 Claims, 6 Drawing Figures

SUPPLEMENTARY COOLING SYSTEM FOR THRUST BEARING

BACKGROUND OF THE INVENTION

This invention relates to large vertical-shaft machines, and in particular it relates to the supplementary cooling of the thrust bearings used in such machines.

Thrust bearings for large vertical-shaft machines usually comprise a downwardly facing ring that is mounted to the rotating component of the machine and a plurality of shoes or bearing segments with upwardly directed bearing surfaces. The bearing segments support the rotating ring on an oil film which is usually provided by having the ring and the bearing segments submerged in an oil bath.

The shoes are mounted on a pivot, or by some other means that permits a limited pivoting action, so that the shoe segment is able to tilt down slightly at the leading edge to form the oil film into a slight wedge-shaped configuration. The tilting action also provides for alignment of the shoe surface with the surface of the rotating ring.

The bearing shoes may each be supported on a single pivot, or may be supported by a plurality of springs, or by distributed discs as described in U.S. Pat. No. 2,565,116—Baudry, issued Aug. 21, 1951, or by mechanical support elements having different mechanical characteristics to provide different, desired, compressive strains as described in Canadian Patent No. 1,116,671 —Starcevic, issued Jan. 19, 1982, or by a plurality of distributed hydraulic elements as described in copending Canadian application, Serial No. 490,652 —Bath, filed Sept. 13, 1985. All these are able to provide the required wedge-shaped oil film between the surface of the shoe and the surface of the rotating ring. There is movement or flow of this oil film which transfers some of the heat generated by the moving surfaces from those surfaces into the oil bath.

Depending on the load per unit area and other factors, the flow of oil across the bearing surfaces may not carry a sufficient quantity of heat from the surfaces. It may be necessary to provide for additional heat dissipation or removal. One way of providing for additional heat removal is by using forced circulation of a coolant through passages in the shoes. This, of course, requires an external pump and means to power the pump. This introduces further complexity.

SUMMARY OF THE INVENTION

The present invention provides supplementary circulation of oil automatically without requiring an external pump. This is done by having cooling passages through each shoe with an entrance and an exit nozzle at the passage ends. The nozzles are positioned close to the periphery of the rotating ring where the oil is in motion. The entrance nozzle is oriented to face into the motion of the oil so that oil flows into the entrance nozzle. The exit nozzle is oriented with the motion of the oil so that oil that has passed through the cooling passages and has picked up heat is discharged into the moving oil in the direction of oil movement. The nozzles can be shaped to encourage this flow.

It should be noted that the cooling provided, supplemental to the cooling provided by the circulation of oil in the oil film, is available regardless of the direction of rotation. When the direction of rotation changes, the entrance nozzle becomes the exit nozzle and vice versa.

Thus the supplemental cooling may be obtained in a pumped storage machine wherein a dynamoelectric machine operates as a motor to pump water to a reservoir when there is excess electrical power, and the water from the reservoir is used to rotate the dynamoelectric machine to generate electrical power when it is required.

It is therefore an object of the invention to provide supplemental cooling of a thrust bearing in a vertical-shaft machine.

It is another object of this invention to provide automatically, without the use of an external motor, a flow of cooling oil in a thrust bearing of a vertical-shaft machine.

It is yet another object of the invention to provide an automatic supplementary flow of cooling oil in a thrust bearing regardless of direction of rotation and without an external motor.

Accordingly there is provided in a thrust bearing for a vertical-shaft rotating machine having a rotating ring mounted to said shaft for rotation with said shaft and having a downwardly directed bearing surface, a plurality of segmented bearing shoes each having radially extending sides, an inner and an outer curved end and each having an upwardly directed bearing surface facing the bearing surface of said rotating ring, and walls defining an oil bath in which said rotating ring and said bearing shoes are immersed, an arrangement providing supplementary cooling of said thrust bearing, comprising at least an upper and a lower portion in each said bearing shoe, the junction between said portions defining a supplementar cooling plane, passages extending in at least one of said upper and lower portions for conducting oil, said passages having a first and a second end terminating at the outer curved end of a respective shoe, said first end being adjacent one of said radially extending sides and said second end being adajcent the other of said radially extending sides, a first and a second nozzle for each said bearing shoe, said first and second nozzles being mounted to the respective shoe and communicating respectively with said first and second end, said nozzles having a vertically extending body portion and a horizontally extending nose portion with an open nozzle end therein, the nose portion of said first and second nozzles being directed in opposite directions whereby oil caused to move by aid rotating ring enters the open nozzle end of the nose portion of said first nozzle, moves through the passages of said supplementary cooling plane, and is discharged from the open nozzle end of the nose portion of said second nozzle.

BRIEF DESCRIPTION OF THE DRAWINGS

The invention will be described with reference to the accompanying drawings, in which.

DESCRIPTION OF THE PREFERRED EMBODIMENTS

Figure 1:
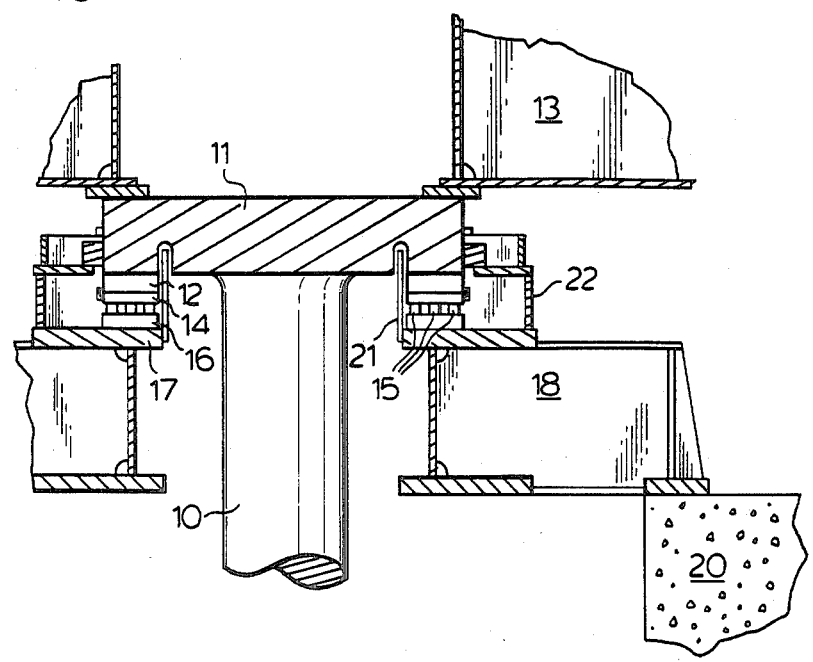
FIG. 1 is a sectional elevation showing a vertical machine shaft with a thrust bearing according to the invention.

Referring to FIG. 1, there is shown a bearing mounting and support structure for a vertical shaft machine such as a hydraulic generator, a motor, or a generator-motor for pumped storage. A vertical shaft 10 extends downwardly to a pump or a turbine (not shown). At the upper end of shaft 10 is a coupling flange 11 to which is coupled a rotor of a dynamoelectric machine indicated by structure 13 but not shown in full. To the underside of flange 11 there is mounted a rotating ring 12. The rotating ring 12 is backed by the relatively massive flange 11 which serves as a thrust block. Ring 12 has a downwardly directed bearing surface. Facing ring 12 is a plurality of bearing segments or shoes 14, each with an upwardly directed bearing surface. The shoes 14 are spaced adjacent one another around shaft 10 as is known. A plurality of elements 15, which may be coiled springs or which may be hydraulic elements as in the aforementioned Canadian Serial No. 490,652, or which may be some other supporting elements, extend from base ring 16 to each bearing segment 14. The elements 15 are arranged to permit a limited tilting movement of each bearing segment or shoe 14.

The base ring 16 is supported on a heavy backing ring 17 which is mounted to a frame 18. The frame 18 is mounted to a foundation structure 20. Walls 21 and 22 extend upwardly from backing ring 17 to form an enclosure or container for oil When the machine is operating, the surfaces of rotating ring 12 and shoes 14, which are immersed in oil, have between them a hydrostatic oil film for lubricating and cooling the bearing surfaces.

Figure 2:
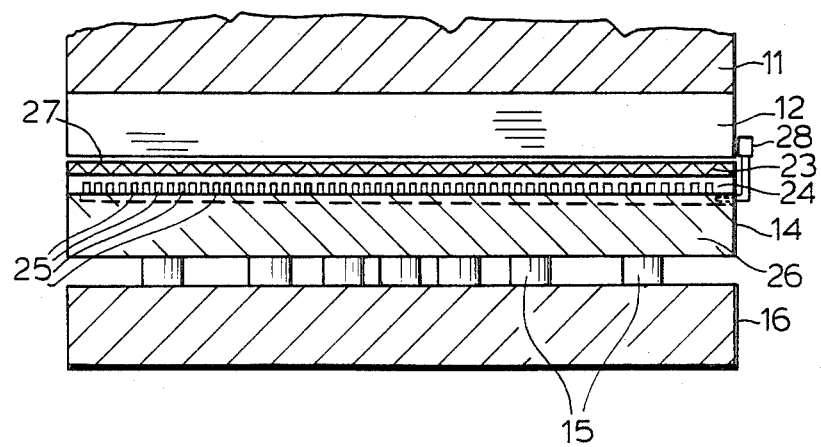
FIG. 2 is a sectional view taken through the rotating ring and a supporting shoe.

Referring now to FIG. 2, the structure of the bearing segment 14, with rotating ring 12, is shown in more detail. A portion of coupling flange 11 is shown with rotating ring 12 fastened thereto. The rotating ring 12 is usually of steel. The shoe 14 has an upper layer of babbitt 23 bonded to an upper portion or segment 24. The upper segment 24 has passages 25 in its lower surface to provide a heat exchange configuration which will be described in more detail subsequently. The passages 25 define a supplementary cooling plane. A nozzle 28 is shown for providing oil to passages 25 as will also be described subsequently. The upper segment 24 is supported by a thicker lower portion 26. The lower portion 26 of the shoe is supported from base ring 16 by support elements 15, such as springs, flexible mechanical elements, hydraulic elements, or the like. The upper segment 24 is preferably of copper or some metal having a high theremal conductivity. The lower portion 26 is preferably steel.

The dimensions of the various parts of shoe 14, as shown in FIG. 2, have been exaggerated for ease of illustration. As an example only of suitable thicknesses, the babbitted layer 23 might be of the order of 2 mm thick, the upper segment 24 might be of the order 25 mm to say 50 mm thick, and the lower backing portion 26 might be of the order of 50 or 75 mm thick. The film 27 of lubicationg oil would, of course, vary in thickness depending on operating conditions.

Figure 3:
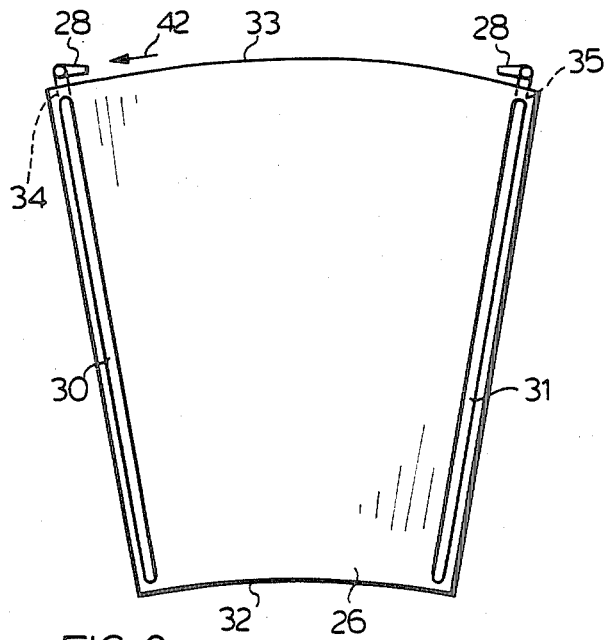
FIG. 3 is a plan view of the upper surface of the lower portion of a shoe.

Referring now to FIG. 3, a segmented lower portion 26 of a shoe 14 is shown in a plan view of its upper face. Two oil conducting grooves 30 and 31 are shown in the surface of lower portion 26. The grooves 30 and 31 are spaced from a respective side of lower portion 26 and extend to within a short distance from inner curved end 32 and outer curved end 33. At the end of grooves 30 and 31 adjacent the outer curved end 33 are bores 34 and 35, respectively, which extend from the end of the respective groove to open on outer curved end 33. To aid in controlling the flow of oil, it has been found desirable to have grooves 30 and 31 deeper at the end of the groove adjacent outer end 33 and gradually decreasing in depth towards the end of the groove adjacent inner end 32.

Figure 4:
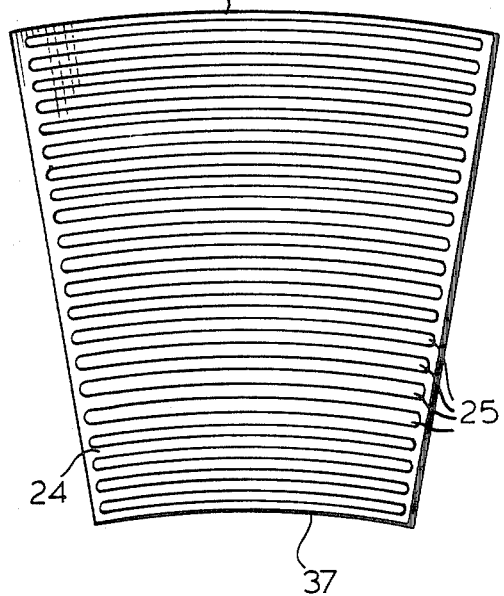
FIG. 4 is a view showing the lower surface of the upper portion of a shoe.

Referring now to FIG. 4, a segmented upper segment 24 of a shoe 14 is shown. It is the lower surface of upper segment 24 shown in FIG. 4, that is, the surface of the upper segment 24 which bears against the upper surface of the lower steel portion 26. A series of passages or grooves 25 are shown in an arc-like configuration. These passages terminate over the respective grooves 30 and 31 (FIG. 3) so that there is communication therebetween. The passages 25 are preferably a plurality of closely adjacent parallel grooves as shown. A greater number of smaller grooves will tend to provide a greater surface through which to transfer heat to oil moving therethrough. As before, to aid in controlling the flow of oil, the passages 25 may be deeper towards curved end 36 and decreasing in depth towards curved end 37. It will be seen that there is a continuous passage for the flow of oil between bores 34 and 35 via groove 30, passages 25, and groove 31.

Figure 6:
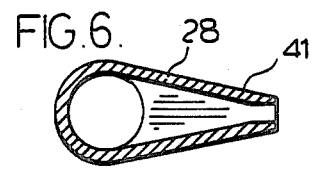
FIG. 6 is a sectional view taken along line 6—6 of FIG. 5.
Figure 5:
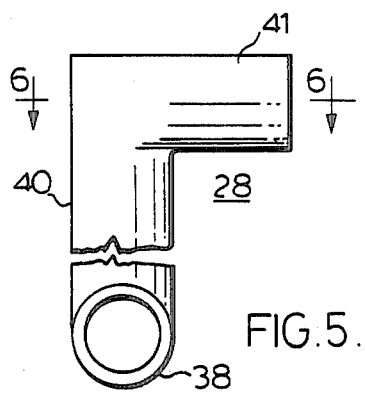
FIG. 5 is a partial side view of a nozzle according to the invention.

Referring to FIGS. 5 and 6, an elevation and a sectional view of nozzle 28 are shown. Nozzle 28 comprises a lateral tubular portion 38, a tubular body portion 40 extending at right angles to the lateral portion 38, and a nose portion 41. The lateral portion 38 may conveniently be threaded on the outside and bores 34 and 35 may have a mating internal thread for mounting nozzle 28 to lower steel portion 26 as indicated in FIG. 3. When the nozzles 28 are mounted, they are preferably oriented as shown in FIG. 3. There are two reasons for this. First, with the direction of rotation as indicated by arrow 42 (FIG. 3), the hottest edge of shoe 14 is the edge which has groove 30, i.e. the trailing edge. The trailing edge is under the influence of the of the highest temperatures in the oil film and is therefore the most likely region to be temperature limited. By having the supplementary cooling oil at its lowest temperature, i.e. the inlet temperature at nozzle 28 and bore 34, circulate first through bore 30 and passage 25 towards the leading ledge, maximum benefit is achieved in limiting the temperature in the babbitt layer, Second, if the nozzles were both oriented or directed in opposite directions, i.e. away from one another, this would place the entry nozzle for one shoe closer to the exit nozzle of the preceding shoe and the warmer exit oil would have a greater tendency to enter the entry nozzle for the next segment.

When a vertical shaft machine is operating in accordance with the invention the rotating ring 12 (FIGS. 1 and 2) is rotating in an oil bath, and the oil adjacent the periphery of rotating ring 12 is caused to move in the direction of rotation. Assuming the oil is moving in the direction indicated by arrow 42 in FIG. 3, oil will enter the nose portion 41 (FIGS. 5 and 6), will pass through bore 34 (FIG. 3) and into groove 30 (FIG. 3). Oil will move from groove 30 through passages 25 (FIG. 4) and into groove 31 (FIG. 3). The oil will exit through bore 35 (FIG. 3) and the nozzle 28 communicating with bore 35 (FIG. 3) and be discharged from nose portion 41 (FIGS. 5 and 6) into the oil bath. Because of the circumferential separation between the inlet nozzle and the outlet nozzle, there is minimal oil discharged from the outlet nozzle that is picked up by the inlet nozzle.

If the direction of rotation of the machine should be changed, the direction of flow of oil is automatically changed to provide the same supplementary cooling in either direction of rotation.

It will be apparent that the passages 25 may take other configurations and the number of passages per shoe may be altered without departing from the invention.

What I claim as new and desire to secure by Letters Patent of the United States is:

1. In a thrust bearing for a vertical-shaft rotating machine having a rotating ring mounted to said shaft for rotation with said shaft and having a downwardly directed bearing surface, a plurality of segmented bearing shoes each having radially extending sides, an inner and an outer curved end and each having an upwardly directed bearing surface facing the bearing surface of said rotating ring, and walls defining an oil both in which said rotating ring and said bearing shoes are immersed, an arrangement providing supplementary cooling of said thrust bearing, comprising:

at least an upper and a lower portion in each said bearing shoe, the junction between said portions defining a supplementary cooling plane, passages extending in at least one of said upper and lower portions for conducting oil, said passages having a first and a second end terminating at the outer curved end of a respective shoe, said first end being adjacent one of said radially extending sides and said second end being adajcent the other of said radially extending sides, a first and a second nozzle for each said bearing shoe, said first and second nozzles being mounted to the respective shoe and communicating respectively with said first and second end, said nozzles having a vertically extending body portion and a horizontally extending nose portion with an open nozzle end therein, the nose portion of said first and second nozzles being directed in opposite directions whereby oil caused to move by said rotating ring enters the open nozzle end of the nose portion of said first nozzle, moves through the passages of said supplementary cooling plane, and is discharged from the open nozzle end of the nose portion of said second nozzle.

2. The thrust bearing of claim 1 in which the nose portions of the first and second nozzles are directed generally towards one another.

3. The thrust bearing of claim 2 in which said upper portion of said shoe includes a copper layer and in which said lower portion includes a steel layer, said copper and steel layers defining said supplementary cooling plane.

4. The thrust bearing of claim 3 in which the upper surface of said steel layer of said shoe has a first and second groove adjacent and parallel to a respective radially extending side, said steel layer having a respective bore extending from and communicating with each said first and second groove at the end of said groove adjacent said outer curved end, said bore extending outwardly to form said first and second ends, and a plurality of spaced apart arc-like passages in the lower surface of said copper layer, each said arc-like passages terminating adjacent said radially extending sides above and in communication with said first and second grooves.

5. The thrust bearing of claim 4 in which each said arc-like passages is a plurality of closely spaced, parallel grooves.

6. A thrust bearing having a rotating ring for mounting to the vertical shaft of a rotating machine to rotate with said shaft, said rotating ring having a downwardly directed bearing surface, a plurality of segmented bearing shoes each having radially extending sides, an inner and outer curved ends and an upwardly directed bearing surface facing the bearing surface of said rotating ring, each said shoe having an upper babbitted surface layer providing the bearing surface, an upper portion of a metal having a high thermal conductivity and a lower steel portion, the upper portion having thereon said babbitted surface layer, the junction between said upper portion and lower steel portion defining a supplementary cooling portion, walls defining a bath for holding oil in which said ring and said shoes are immersed, and a supplementary cooling arrangement, comprising:

first and second grooves defined by the upper surface of said lower steel portion extending parallel with and spaced from a respective radially extending side of said shoe and terminating adjacent said inner and outer ends, a plurality of spaced apart passages defined by the lower surface of said upper portion, terminating adjacent said radially extending sides and in communication with said first and second grooves, a first and a second bore extending respectively from the end of said first and second grooves to said outer curved end, a first and a second nozzle mounted to said steel portion, communicating respectively with said first and second bore, each nozzle having a lateral portion extending outwardly from said curved end, a body portion extending upwardly and a horizontally extending nose portion having an open end, said nose portion of said first and second nozzles being adjacent the periphery of said rotating ring with said open ends thereof oriented in opposite directions, whereby oil caused to move with rotation of said rotating ring moves into the open end of said first nozzle, through said first bore, said first groove, said passages, said second groove, said second bore and is discharged through the open end of said second nozzle, providing supplementary cooling for the respective shoes.

7. A thrust bearing is defined in claim 6 in which the nose portions of said first and second nozzles are oriented generally towards one another.

8. A thrust bearing as defined in claim 7 in which said first and second grooves decrease in depth from the end with said bore towards the bore end adjacent said inner end.

9. A thrust bearing as defined in claim 8 in which said plurality of spaced apart passages in a shoe are closely spaced, arc-like grooves and the passage closer to said outer curved end are deeper than the passages closer to said inner curved end.

10. A thrust bearing as defined in claim 9 in which each said upper portion is of copper.

* * * * *